US011023120B1

(12) United States Patent
Brichter

(10) Patent No.: US 11,023,120 B1
(45) Date of Patent: Jun. 1, 2021

(54) USER INTERFACE MECHANICS

(71) Applicant: Twitter, Inc., San Francisco, CA (US)

(72) Inventor: Loren Brichter, San Francisco, CA (US)

(73) Assignee: TWITTER, INC., San Francisco, CA (US)

( * ) Notice: Subject to any disclaimer, the term of this patent is extended or adjusted under 35 U.S.C. 154(b) by 342 days.

(21) Appl. No.: 15/197,695

(22) Filed: Jun. 29, 2016

Related U.S. Application Data

(63) Continuation of application No. 13/770,979, filed on Feb. 19, 2013, now Pat. No. 9,405,453, which is a continuation of application No. 12/756,574, filed on Apr. 8, 2010, now Pat. No. 8,448,084.

(51) Int. Cl.
| | | |
|---|---|---|
| *G06F 3/048* | (2013.01) | |
| *G06F 3/0485* | (2013.01) | |
| *G06F 3/0482* | (2013.01) | |
| *G06F 3/0484* | (2013.01) | |
| *G06F 3/0488* | (2013.01) | |

(52) U.S. Cl.
CPC .......... *G06F 3/0485* (2013.01); *G06F 3/0482* (2013.01); *G06F 3/0488* (2013.01); *G06F 3/04845* (2013.01); *G06F 3/04855* (2013.01)

(58) Field of Classification Search
CPC .. G06F 3/0485; G06F 3/0482; G06F 3/04845; G06F 3/04855; G06F 3/0488
See application file for complete search history.

(56) References Cited

U.S. PATENT DOCUMENTS

| | | | |
|---|---|---|---|
| 5,844,547 A * | 12/1998 | Minakuchi | G06F 3/0481 |
| | | | 345/173 |
| 5,923,861 A | 7/1999 | Bertram et al. | |
| 6,518,984 B1 | 2/2003 | Maeckel et al. | |
| 6,665,722 B1 | 12/2003 | Elliott | |
| 6,738,804 B1 | 5/2004 | Lo | |
| 7,130,389 B1 | 10/2006 | Rodkey et al. | |
| 7,409,428 B1 | 8/2008 | Brabec et al. | |
| 7,469,381 B2 | 12/2008 | Ording | |
| 7,496,183 B1 | 2/2009 | Rodkey et al. | |
| 7,519,165 B1 | 4/2009 | Rodkey et al. | |
| 8,448,084 B2 | 5/2013 | Brichter | |
| 9,256,355 B1 * | 2/2016 | Tseng | G06F 1/1624 |
| 9,405,453 B1 | 8/2016 | Brichter | |

(Continued)

OTHER PUBLICATIONS

Doty, Dovin, EGORefresh Tableheader View.m Demo, Oct. 14, 2009, 6 pages.

*Primary Examiner* — Tadesse Hailu
(74) *Attorney, Agent, or Firm* — Nixon & Vanderhye, P.C.

(57) ABSTRACT

Methods, computer readable media, and apparatuses for providing enhanced user interface mechanics are presented. In one arrangement, a scrollable list of content items may be displayed. Input associated with a scroll command may be received. Then, based on the scroll command, a scrollable refresh trigger may be displayed. Subsequently, the scrollable list of content items may be refreshed in response to determining, based on the scroll command, that the scrollable refresh trigger has been activated. In at least one instance, it may be determined that the scrollable refresh trigger has been activated in response to determining that the scroll command was completed while the scrollable refresh trigger was fully displayed.

29 Claims, 12 Drawing Sheets

(56) References Cited

U.S. PATENT DOCUMENTS

| | | |
|---|---|---|
| 2002/0199061 A1 | 12/2002 | Friedman et al. |
| 2004/0193449 A1* | 9/2004 | Wildman ............... G16H 40/20 705/2 |
| 2005/0091604 A1 | 4/2005 | Davis |
| 2007/0067305 A1* | 3/2007 | Ives ..................... G06Q 30/02 |
| 2007/0109275 A1 | 5/2007 | Chuang |
| 2007/0277126 A1 | 11/2007 | Park et al. |
| 2008/0036743 A1 | 2/2008 | Westerman |
| 2008/0055273 A1 | 3/2008 | Forstall |
| 2008/0122796 A1* | 5/2008 | Jobs ..................... G06F 3/0488 345/173 |
| 2008/0180408 A1* | 7/2008 | Forstall ................ G06F 3/0486 345/177 |
| 2009/0064031 A1* | 3/2009 | Bull ..................... G06F 3/0485 715/784 |
| 2009/0070711 A1* | 3/2009 | Kwak .................. G06F 3/0488 715/829 |
| 2009/0083646 A1* | 3/2009 | Lin ..................... G06F 16/9577 715/769 |
| 2009/0132281 A1* | 5/2009 | Lyshkow ............ G06F 19/3418 705/3 |
| 2009/0157693 A1* | 6/2009 | Palahnuk ............ G06Q 30/0273 |
| 2009/0228774 A1 | 9/2009 | Matheny et al. |
| 2009/0228807 A1* | 9/2009 | Lemay ................ G06F 3/0488 715/752 |
| 2009/0228825 A1* | 9/2009 | Van Os ............... G06F 3/0488 715/780 |
| 2009/0289913 A1* | 11/2009 | Chang ................. G06F 3/0485 345/173 |
| 2009/0327950 A1 | 12/2009 | Kuo |
| 2010/0070872 A1 | 3/2010 | Trujillo |
| 2010/0090964 A1* | 4/2010 | Soo ..................... G06F 3/0416 345/173 |
| 2010/0107066 A1 | 4/2010 | Hitola et al. |
| 2010/0107116 A1 | 4/2010 | Rieman et al. |
| 2010/0268762 A1* | 10/2010 | Pahlavan ............. G06F 3/0485 709/203 |
| 2010/0293462 A1* | 11/2010 | Bull ..................... G06F 9/452 715/716 |
| 2011/0037777 A1* | 2/2011 | Lindahl ................ G06F 1/1626 345/619 |
| 2011/0063234 A1* | 3/2011 | Liu ..................... G06F 3/0488 345/173 |
| 2011/0090255 A1 | 4/2011 | Wilson et al. |
| 2011/0099607 A1* | 4/2011 | Cohen .................. H04L 63/123 726/3 |
| 2011/0115721 A1 | 5/2011 | Li et al. |
| 2011/0157029 A1 | 6/2011 | Tseng |
| 2011/0265003 A1 | 10/2011 | Schubert |
| 2012/0036443 A1* | 2/2012 | Ohmori ................ G06F 3/0488 715/736 |
| 2012/0083260 A1* | 4/2012 | Arriola ................. G06F 16/58 455/418 |
| 2012/0266068 A1* | 10/2012 | Ryman ................. G06F 3/04883 715/719 |
| 2012/0311438 A1* | 12/2012 | Cranfill ................ G06Q 20/123 715/256 |
| 2013/0278533 A1* | 10/2013 | Kim ..................... G06F 3/0488 345/173 |

\* cited by examiner

USER INTERFACE MECHANICS

This application is a continuation of U.S. application Ser. No. 13/770,979, filed Feb. 19, 2013, now U.S. Pat. No. 9,405,453, which is a continuation of U.S. application Ser. No. 12/756,574, filed Apr. 8, 2010, now U.S. Pat. No. 8,448,084, the contents of each of which are incorporated herein in their entirety. Accordingly, this application claims benefit from the '979 and '574 applications under 35 U.S.C. Section 120.

BACKGROUND

In recent decades, computing devices have taken on an expanding role in the daily life of many people. For example, many people use desktop and laptop computers at home and at work for a variety of tasks, such as communicating with others, consuming digital content (such as online news, music, and movies), creating digital content, analyzing data, organizing tasks and calendars, and performing a myriad of other functions. In addition, many people use and travel with cellular phones, personal digital assistants, mobile computing devices (such as the iPhone by APPLE), tablet computers, and a variety of other computing devices that also provide similar functionalities.

Increasingly, computing devices also include touch-sensitive displays to facilitate receiving user input in a more convenient manner. But whether or not computing devices include touch-sensitive displays, users of computing devices demand greater convenience and ease of use in interacting with such devices. In many instances, such convenience and ease of use may be provided to users by enhancing the user interfaces via which the users interact with computing devices.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to user interface mechanics. According to one or more aspects, a content area may be displayed. Input associated with a first command may be received, and the first command may include a request to scroll the content area. Then, based on the first command, a second command may be performed, and the second command may be independent of the first command. In other words, whether the second command is performed may be based on the first command, but the second command itself may be a command that is otherwise unrelated to scrolling the content area. For instance, in at least one arrangement, performing the second command may include refreshing the content area.

According to one or more additional aspects, a scrollable list of content items may be displayed. Input associated with a scroll command may be received. Then, based on the scroll command, a scrollable refresh trigger may be displayed. Subsequently, the scrollable list of content items may be refreshed in response to determining, based on the scroll command, that the scrollable refresh trigger has been activated. In at least one arrangement, it may be determined that the scrollable refresh trigger has been activated in response to determining that the scroll command was completed while the scrollable refresh trigger was fully displayed.

According to one or more additional aspects, a scrollable list of content items may be displayed, and the scrollable list of content items may include a plurality of discrete content items arranged chronologically. Input associated with a scroll command may be received, and the input may represent touch-based user input. Then, based on the scroll command, a scrollable refresh trigger that is configured to scroll with the scrollable list of content items may be displayed. Subsequently, an instruction associated with activating the scrollable refresh trigger may be provided in response to determining that the scrollable refresh trigger is fully displayed. The scrollable list of content items may be refreshed in response to determining that the scroll command was completed while the scrollable refresh trigger was fully displayed. In addition, the scrollable list of content items may be scrolled automatically, such that the scrollable refresh trigger might no longer be displayed, in response to determining that the scrollable list of content items has been refreshed.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
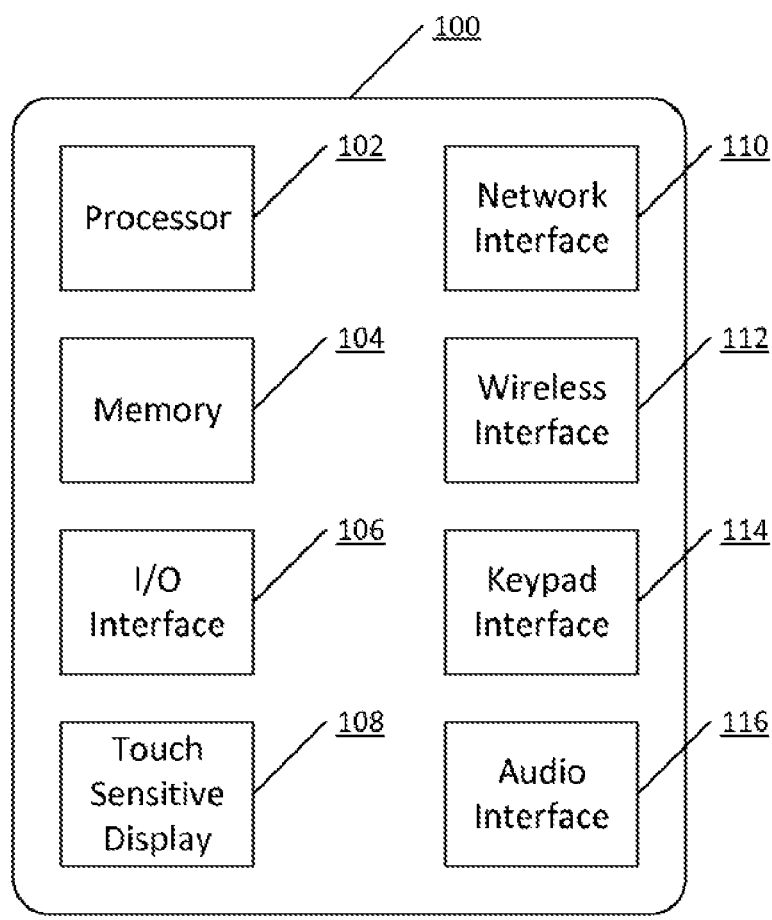
FIG. 1 illustrates an example computing device according to one or more aspects described herein.

FIG. 1 illustrates an example computing device according to one or more aspects described herein. Computing device 100 may include one or more hardware and/or software components, such as processor 102, memory 104, input/output interface 106, touch sensitive display 108, network interface 110, wireless interface 112, keypad interface 114, and audio interface 116. By including one or more of these and/or other components, computing device 100 may be used as a desktop computer, laptop computer, server, tablet computer, netbook, cellular phone, mobile computing device, and/or the like. In at least one arrangement, computing device 100 may include a plurality of each of the components described herein. For instance, in at least one arrangement, computing device 100 may include two or more processors.

In one or more arrangements, processor 102 may execute computer-executable and/or computer-readable instructions stored in memory 104. For instance, processor 102 may execute instructions that cause one or more of the methods described herein to be performed by computing device 100. Additionally or alternatively, processor 102 may execute instructions that cause one or more user interfaces described herein to be displayed on a display included in computing device 100, such as touch sensitive display 108.

In one or more arrangements, touch sensitive display 108 may comprise an electronic visual display (e.g., a liquid crystal display ("LCD") screen, a plasma display panel ("PDP"), a cathode ray tube ("CRT") display, a light emitting diode ("LED") display, and/or an organic light emitting diode ("OLED") display). Touch sensitive display 108 may respond to touch-based user input and thus may function as a "touch screen" display.

Touch sensitive display 108 may implement one or more touch sensing technologies (e.g., resistive, surface acoustic wave, capacitive, strain gauge, optical imaging, dispersive signal technology, acoustic pulse recognition, coded LCD, etc.).

In one or more arrangements, input/output interface 106 may include one or more adapters, connection ports, and other components via which computing device 100 may provide input and output. For instance, input/output interface 106 may include one or more adapters for outputting data to and/or receiving data from a display (e.g., for providing audiovisual, graphical, and/or textual output), keypad, microphone, mouse, optical reader, scanner, speaker (e.g., for providing audio output), stylus, touch screen, and/or other component. Input/output interface 106 further may include a USB port, serial port, parallel port, IEEE 1394/Firewire port, APPLE iPod Dock port, and/or other ports.

In one or more arrangements, network interface 110 may establish and/or provide network connectivity to a network (e.g., a local area network, a wide area network, such as the Internet, etc.). Network interface 110 thus may include hardware and/or software components for communicating via Ethernet, TCP/IP, FTP, HTTP, HTTPS, and/or other protocols. Similarly, wireless interface 112 may establish and/or provide network connectivity to a wireless network (e.g., a local area network, a wide area network, such as the Internet, a cellular voice and/or data network, etc.). Wireless interface 112 thus may include hardware and/or software components for communicating via Ethernet, TCP/IP, FTP, HTTP, HTTPS, IEEE 802.11b/g/a/n, Bluetooth, CDMA, TDMA, GSM and/or other protocols.

In one or more arrangements, keypad interface 114 may include one or more physical keys, buttons, and/or switches that may be operated to provide input to and/or control various aspects of computing device 100. Audio interface 116 may include one or more speakers, audio ports (e.g., a headphone jack), microphones, and/or other audio components. Audio interface 116 may allow computing device 100 to provide audio feedback, receive audio input (e.g., sound input, speech commands, etc.), and/or provide telephone functionalities.

Figure 2:
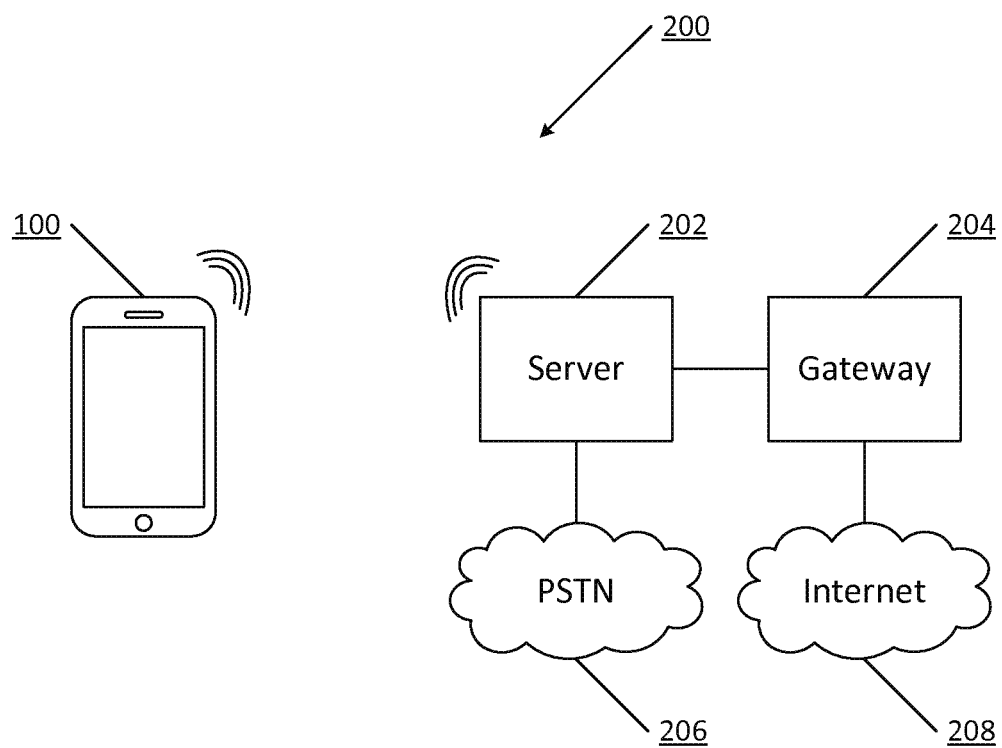
FIG. 2 illustrates an example operating environment according to one or more aspects described herein.

In at least one arrangement, computing device 100 may comprise a commercially-available, touch-sensitive mobile computing device, such as an APPLE iPhone, an APPLE iPad, a GOOGLE Nexus One, a MOTOROLA Droid, a PALM Pre, and/or the like. In at least one additional arrangement, computing device 100 may comprise a commercially-available computing device, such as an APPLE iMac all-in-one computer, an APPLE MacBook laptop, a LENOVO ThinkPad laptop, an ACER Aspire One netbook, a DELL OptiPlex desktop, an HP Pavilion tablet, and/or the like. 1221 FIG. 2 illustrates an example operating environment according to one or more aspects described herein. Operating environment 200 may include a server 202, a gateway 204, a public switched telephone network ("PSTN") 206, and/or other networks, such as the Internet 208, a cellular network, a satellite network, and/or the like. Computing device 100 may operate within operating environment 200 using one or more of the hardware and/or software components described above.

In one or more arrangements, computing device 100 may communicate with server 202 via a wireless and/or wired network. For instance, server 202 may connect to and/or communicate with computing device 100 via a wireless cellular network. In addition, server 202 may connect computing device 100 to PSTN 206, and this connection may enable computing device 100 to make and/or receive telephone calls. Server 202 also may connect computing device 100 to gateway 204, and this connection may enable computing device 100 to access a wide area network, such as the Internet 208. Accordingly, computing device 100 may include wireless voice and data functionalities, and computing device 100 may provide functionalities similar to and/or be used as a smartphone, tablet, netbook, and/or other mobile computing device.

Figure 3:
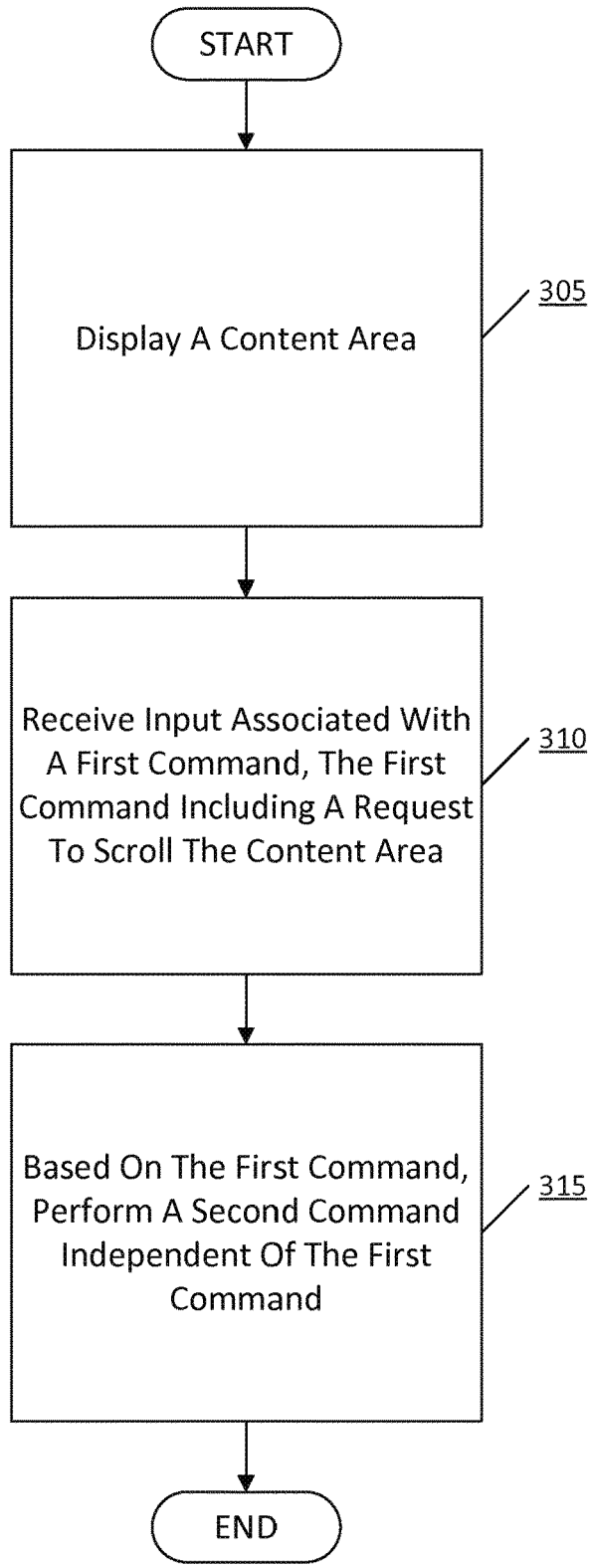
FIG. 3 illustrates an example method by which a command may be performed according to one or more aspects described herein.

FIG. 3 illustrates an example method by which a command may be performed according to one or more aspects described herein. According to one or more aspects, the methods described herein, such as the method illustrated in FIG. 3, may be implemented in and/or performed by and/or in conjunction with a computing device, such as computing device 100.

In step 305, a content area may be displayed. For example, computing device 100 may display a user interface that includes a content area (e.g., user interface 600 of FIG. 6, which is further described below). The content area may include any sort of content, such as text, images, audio, video, links, and/or other digital content. In at least one arrangement, the content area may include a list of content items. For instance, the content area may include a chronologically-arranged listing of personal status updates, blog entries, micro-blogging posts (e.g., tweets and/or other status updates associated with TWITTER, status updates associated with GOOGLE BUZZ, status updates associated with FACEBOOK, etc.), news headlines, news articles, text, images, audio, video, links, and/or other content items.

In step 310, input associated with a first command may be received, and the first command may include a request to scroll the content area. For example, after displaying a content area (e.g., in step 305), computing device 100 may receive user input associated with a request to scroll the content area. Such user input may be received in connection with a variety of input actions, such as a user interacting with a displayed scroll bar, a user clicking and dragging a content item included in the content area, a user physically manipulating a scroll wheel included in a mouse, and/or a user otherwise interacting with hardware and/or software components of computing device 100. For example, a user may initiate a scroll command by clicking and dragging a content item and/or a handle included in the content area using a mouse (e.g., by clicking on and/or selecting a content item and then holding down the mouse button while moving the mouse), and a user may complete the scroll command by concluding the dragging (e.g., by releasing the mouse button).

In at least one arrangement, the received input may represent touch-based user input. For instance, the received input may be touch-based user input, associated with a scroll command and received by computing device 100 via touch sensitive display 108, indicating that a user physically contacted a point on display 108 corresponding to the content area, moved the point of contact along the touch screen (e.g., thereby requesting computing device 100 to scroll the content area) while maintaining continuous contact with the screen, and then released contact with the screen (e.g., thereby completing the scroll command). Additionally or alternatively, computing device 100 may receive touch-based user input via a touch-sensitive pad, a touch-sensitive stylus, a touch-sensitive mouse (e.g., a commercially-available APPLE Magic Mouse), and/or any touch-sensitive surface.

Further, the manner by which a scroll command is requested and/or completed using any touch-sensitive surface may be similar to the manner described in the example above involving a user's finger (e.g., the user may engage and drag a content item to initiate a scroll command, and the user may release and/or finish dragging the content item to complete the scroll command).

In step 315, a second command, independent of the first command, may be performed based on the first command. The second command may be considered independent of the first command, for instance, because in a generic computing device, performing the second command might not require performing the first command and/or performing the first command might not require performing the second command. According to one or more aspects of the disclosure, however, while the second command may be independent of the first command, performing the second command may be based on the first command.

More particularly, whether the second command is performed may be based on the first command, but the second command itself may be a command that is otherwise unrelated to scrolling the content area. In at least one arrangement, performing the second command may be triggered by a continuation of the user input corresponding to the first command.

For example, the first command may include a scroll command that was completed while an indicator and/or action trigger was displayed, and because the indicator and/or action trigger was displayed when the scroll command was completed, a second command, independent of the first command, (e.g., refreshing the content area and/or content items in a listing included in the content area) may be performed. In this example, performing the second command may have been triggered by the continuation of the user input corresponding to the first command, as the user input associated with the scroll command continued and was not completed until after the indicator and/or action trigger was displayed. In another example, which is further described below, the first command may include a first scroll request and a second scroll request, different from the first scroll request, and the second command to be performed may depend on and/or may be based on the first scroll request and the second scroll request (e.g., the combination of the first scroll request and the second scroll request may dictate what action and/or command should be performed as the second command). Similarly, the first command may include any number of scroll commands, and the particular scroll commands included in the first command may dictate what action and/or command should be performed as the second command.

While, in the example described above, refreshing the content area is provided as an example of a second command that may be independent of the first command (e.g., the scroll command), the second command may include any sort of command that may be independent of the first command (e.g., the scroll command). For instance, the second command may include saving at least a portion of the contents of the content area, printing at least a portion of the content area, playing at least a portion of the audio and/or visual contents of the content area, invoking a text-to-speech converter to read aloud at least a portion of the contents of the content area, causing a dialog box and/or prompt to be displayed allowing further action to be taken with respect to the contents of the content area, causing a prompt to be displayed via which a user may email at least a portion of the contents of the content area to another person, navigating between pages of content, locking screen orientations (e.g., locking the screen orientation in "landscape" view, such that even if the device physically is rotated to a "portrait" orientation, the screen will continue to display the content area in landscape view), entering into a new mode (e.g., in a word processing application, switching from a text editing mode to a graphics editing mode; in a presentation tool, switching between a slide layout editing mode to a slide animation editing mode; in a content display application, switching a content designation from "read" or "unread" or vice versa; etc.), and/or performing another action.

In one or more arrangements, the first command may include a first scroll request and a second scroll request, where the second scroll request may be distinct and/or different from the first scroll request, and the second command may be performed based on the first scroll request and the second scroll request. Additionally or alternatively, the first scroll request and the second scroll request may be continuous. Stated differently, the second scroll request (e.g., scrolling to the right side of the display) may be initiated and completed after the first scroll request (e.g., scrolling to the bottom side of the display) has been initiated, but before the first scroll request has been completed (e.g., before the user has lifted their finger corresponding to the first scroll request from the touch screen). In at least one additional arrangement, the first scroll request and the second scroll request may be associated with touch-based user input corresponding to a first contact point and a second contact point, respectively (e.g., the user may use one finger to initiate and complete the first scroll request and another finger to initiate and complete the second scroll request).

For example, scrolling a content area down (e.g., toward the bottom of the display and/or toward the bottom of the content area to reveal and/or cause to be displayed an indicator and/or an action trigger) and then scrolling left may cause a first action to be performed as the second command (e.g., saving at least a portion of the contents of the content area, causing a prompt to be displayed via which a user may email at least a portion of the contents of the content area to another person, etc.). In this example, scrolling the content area down may be considered the first scroll request, and the scrolling left may be considered the second scroll request. In another example, scrolling a content area down (e.g., to reveal and/or cause to be displayed an indicator and/or an action trigger) and then scrolling right may cause a second action to be performed as the second command (e.g., invoking a text-to-speech converter to read aloud at least a portion of the contents of the content area, printing at least a portion of the content area, etc.). In this second example, scrolling the content area down may be considered the first scroll request, and scrolling right may be considered the second scroll request.

In at least one additional arrangement, the second command may depend on and/or change based on the amount of time that an indicator, an action trigger, and/or a scrollable refresh trigger is displayed (e.g., before the first command is completed). For example, in one instance, the first command may include a scroll command that is completed less than four seconds after an action trigger is displayed. In this instance, when the first command is completed, a second command may be performed, and the second command may include refreshing the content area. In another instance, however, the first command may include a scroll command that is completed four or more seconds after an action trigger is displayed.

In this instance, when the first command is completed, a different second command may be performed, and this different second command may include locking the screen orientation.

Figure 4:
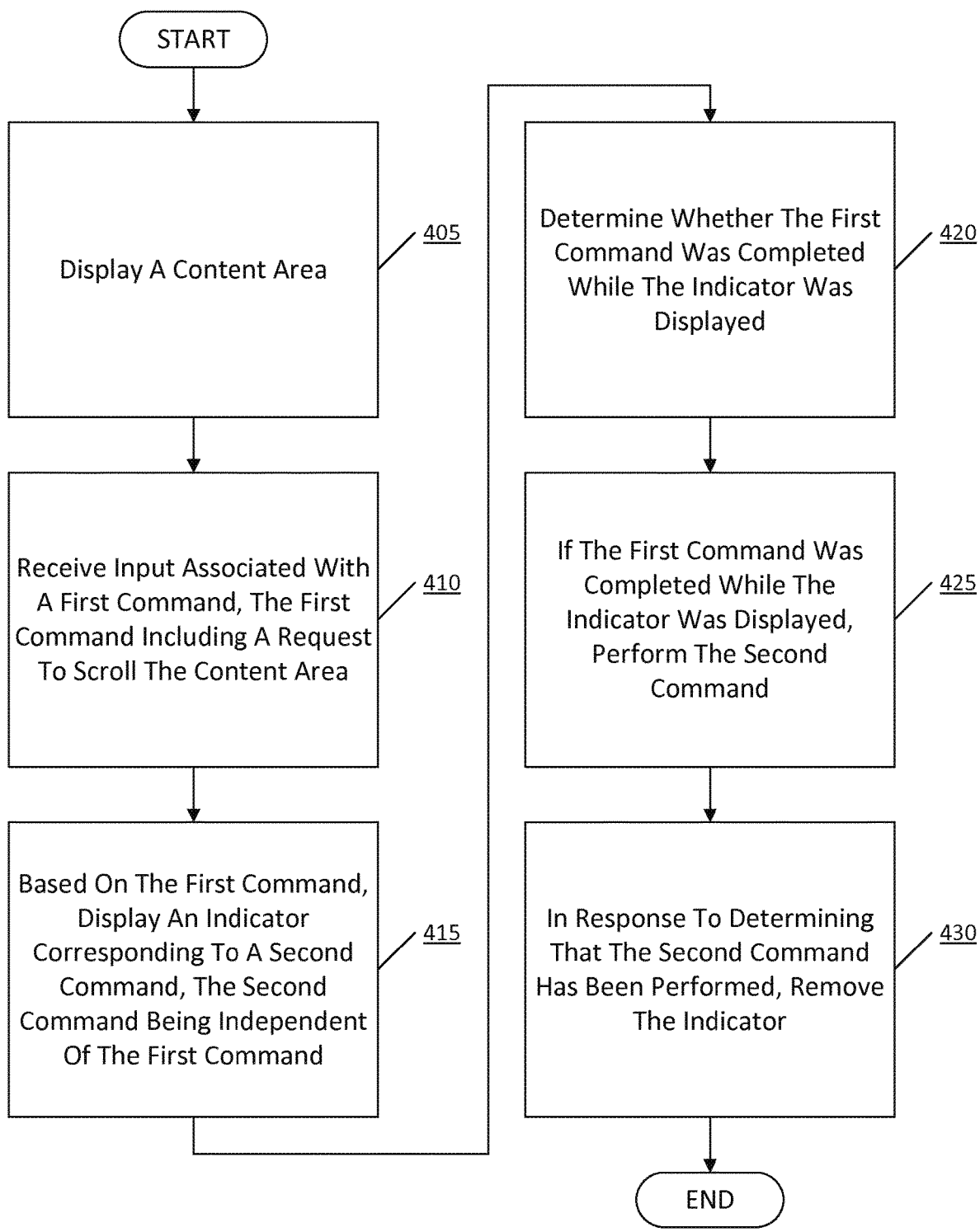
FIG. 4 illustrates another example method by which a command may be performed according to one or more aspects described herein.

FIG. 4 illustrates another example method by which a command may be performed according to one or more aspects described herein. According to one or more aspects, the methods described herein, such as the method illustrated in FIG. 4, may be implemented in and/or performed by and/or in conjunction with a computing device, such as computing device 100.

In step 405, a content area may be displayed. For example, as in step 305 (which was described above with respect to FIG. 3), computing device 100 may display a user interface that includes a content area (e.g., user interface 600 of FIG. 6, which is further described below). The content area may include any sort of content, such as text, images, audio, video, links, and/or other digital content. In at least one arrangement, the content area may include a list of content items. For instance, the content area may include a chronologically-arranged listing of personal status updates, blog entries, micro-blogging posts (e.g., tweets and/or other status updates associated with TWITTER, status updates associated with GOOGLE BUZZ, status updates associated with FACEBOOK, etc.), news headlines, news articles, text, images, audio, video, links, and/or other content items.

In step 410, input associated with a first command may be received, and the first command may include a request to scroll the content area. For example, as in step 310 (which was described above with respect to FIG. 3), after displaying a content area (e.g., in step 405), computing device 100 may receive user input associated with a request to scroll the content area. As also described above, the user input associated with a request to scroll the content area may be received in connection with a variety of input actions, such as a user interacting with a displayed scroll bar, a user clicking and dragging a content item included in the content area, a user physically manipulating a scroll wheel included in a mouse, and/or a user otherwise interacting with hardware and/or software components of computing device 100. For example, a user may initiate a scroll command by clicking and dragging (e.g., by clicking on and/or selecting a content item and then holding down the mouse button while moving the mouse) a content item included in the content area using a mouse, and a user may complete the scroll command by concluding the dragging (e.g., by releasing the mouse button).

In at least one arrangement, the received input may represent touch-based user input. For instance, the received input may be touch-based user input, associated with a scroll command and received by computing device 100 via touch sensitive display 108, indicating that a user put a finger down on a point within the content area, slid the finger along the touch screen (e.g., thereby requesting computing device 100 to scroll the content area), and then released the finger (e.g., thereby completing the scroll command).

Additionally or alternatively, computing device 100 may receive touch-based user input via a touch-sensitive pad, a touch-sensitive stylus, a touch-sensitive mouse (e.g., a commercially-available APPLE Magic Mouse), and/or any touch-sensitive surface.

Further, the manner by which a scroll command is requested and/or completed using any touch-sensitive surface may be similar to the manner described in the example above involving a user's finger (e.g., the user may engage and drag a content item to initiate a scroll command, and the user may release and/or finish dragging the content item to complete the scroll command).

In step 415, an indicator corresponding to a second command may be displayed based on the first command, and the second command may be independent of the first command.

For example, the first command may include a scroll command that causes the content area to be scrolled, and as the content area is scrolled, an indicator may be displayed and/or revealed. The indicator may be scrollable (e.g., the indicator may scroll with one or more content items included in the content area), and the indicator may be adjacent to a displayed or undisplayed content item.

In at least one arrangement, the indicator may be adjacent to a content item that is the most recent content item included in the content area. In at least one additional arrangement, the indicator may be adjacent to a content item that is the most relevant content item included in the content area, where relevance may be determined based on a search operation (e.g., a keyword search requested by a user with respect to the one or more content items included in the content area).

In one or more arrangements, the indicator may include additional components. For instance, the indicator may include an animated graphic (e.g., an arrow rotating, a spring decompressing, a lock unlocking, etc.), one or more instructions (e.g., an instruction associated with displaying the indicator, an instruction associated with causing the second command to be performed, etc.), one or more status descriptions (e.g., a status description indicating the freshness of the content, a status description indicating when the content area and/or the content items included in the content area were last refreshed, a status description indicating that the content area is being refreshed, a status description indicating that one or more content items are being loaded, a status description indicating when one or more content items were previously loaded, a status description indicating the text and/or keywords that were used in a search operation, a status description indicating when a search operation was performed, etc.), one or more previews and/or thumbnails (e.g., when navigating through multiple pages of content, the indicator may include thumbnail images of the previous and/or next pages).

In addition, the second command may be independent of the first command. For example, whereas the first command may include a scroll command, the second command may include any other command that is independent of a scroll command. Thus, the second command may include, for instance, refreshing the content area, refreshing content items and/or a listing (e.g., a listing of content items) included in the content area, saving at least a portion of the contents of the content area, printing at least a portion of the content area, playing at least a portion of the audio and/or visual contents of the content area, invoking a text-to-speech converter to read aloud at least a portion of the contents of the content area, causing a dialog box and/or prompt to be displayed allowing further action to be taken with respect to the contents of the content area, causing a prompt to be displayed via which a user may email at least a portion of the contents of the content area to another person, and/or performing another action.

In step 420, it may be determined whether the first command was completed while the indicator was displayed. For example, the first command may include a scroll command associated with a request to scroll the content area, and computing device 100 may determine whether the scroll command was completed while the indicator was displayed.

Where, for instance, a user initiates a scroll command by clicking and dragging a content item and/or a handle included in the content area using a mouse (e.g., by clicking on and/or selecting a content item and then holding down the mouse button while moving the mouse), it may be determined that the scroll command is completed when the user concludes the dragging (e.g., by releasing the mouse button). In this example, if and when the user concludes the dragging (e.g., by releasing the mouse button), computing device 100 then may determine whether the indicator was displayed (e.g., on touch sensitive display 108) when the user concluded the dragging.

In another example, where a user initiates a scroll command by putting one or more fingers down on the displayed content area and/or on the one or more content items included therein (e.g., as displayed on touch sensitive display 108) and scrolls by sliding the one or more fingers along the displayed content area (e.g., along touch sensitive display 108), it may be determined that the scroll command is completed when the user concludes the sliding, releases the displayed content area and/or the one or more content items, and/or lifts up the one or more fingers. Of course, instead of one or more fingers, a stylus or other object also could be used in a similar manner to accomplish the same purpose.

In step 425, the second command may be performed if the first command was completed while the indicator was displayed. For example, if it is determined in step 420 that the first command was completed while the indicator was displayed, the second command may be performed. On the other hand, if it is determined in step 420 that the first command was completed while the indicator was not displayed, the second command might not be performed. In at least one arrangement, the first command may be considered to be completed when the user input associated with the first command has concluded. For example, where the first command includes a scroll request associated with touch-based user input, the first command may be considered to be completed when the user lifts up their finger from a touch screen.

In one or more arrangements, the first command may include a first scroll request and a second scroll request, where the second scroll request may be distinct and/or different from the first scroll request, and the second command may be performed based on the first scroll request and the second scroll request. Additionally or alternatively, the first scroll request and the second scroll request may be continuous. Stated differently, the second scroll request (e.g., scrolling to the right side of the display) may be initiated and completed after the first scroll request (e.g., scrolling to the bottom side of the display) has been initiated, but before the first scroll request has been completed (e.g., before the user has lifted their finger corresponding to the first scroll request from the touch screen). In at least one additional arrangement, the first scroll request and the second scroll request may be associated with touch-based user input corresponding to a first contact point and a second contact point, respectively (e.g., the user may use one finger to initiate and complete the first scroll request and another finger to initiate and complete the second scroll request).

For example, scrolling a content area down (e.g., to reveal and/or cause to be displayed an indicator and/or an action trigger) and then scrolling left may cause a first action to be performed as the second command (e.g., saving at least a portion of the contents of the content area, causing a prompt to be displayed via which a user may email at least a portion of the contents of the content area to another person, etc.). In this example, scrolling the content area down may be considered the first scroll request, and the scrolling left may be considered the second scroll request. In another example, scrolling a content area down (e.g., to reveal and/or cause to be displayed an indicator and/or an action trigger) and then scrolling right may cause a second action to be performed as the second command (e.g., invoking a text-to-speech converter to read aloud at least a portion of the contents of the content area, printing at least a portion of the content area, etc.). In this second example, scrolling the content area down may be considered the first scroll request, and scrolling right may be considered the second scroll request.

In one or more additional arrangements, the second command may be performed only if the indicator was fully displayed when the first command was completed. By performing the second command only if the indicator was fully displayed when the first command was completed, the indicator may be used as a trigger that may cause the second command to be performed only when the trigger is engaged (e.g., when the indicator is fully displayed).

For example, computing device 100 may determine whether the indicator was fully displayed on touch sensitive display 108 when the first command was completed. If it is determined that the indicator was fully displayed when the first command was completed, then the second command may be performed. On the other hand, if it is determined that the indicator was not fully displayed when the first command was completed (e.g., if the indicator was only partially displayed or not displayed at all), then the second command might not be performed.

Figure 5A:
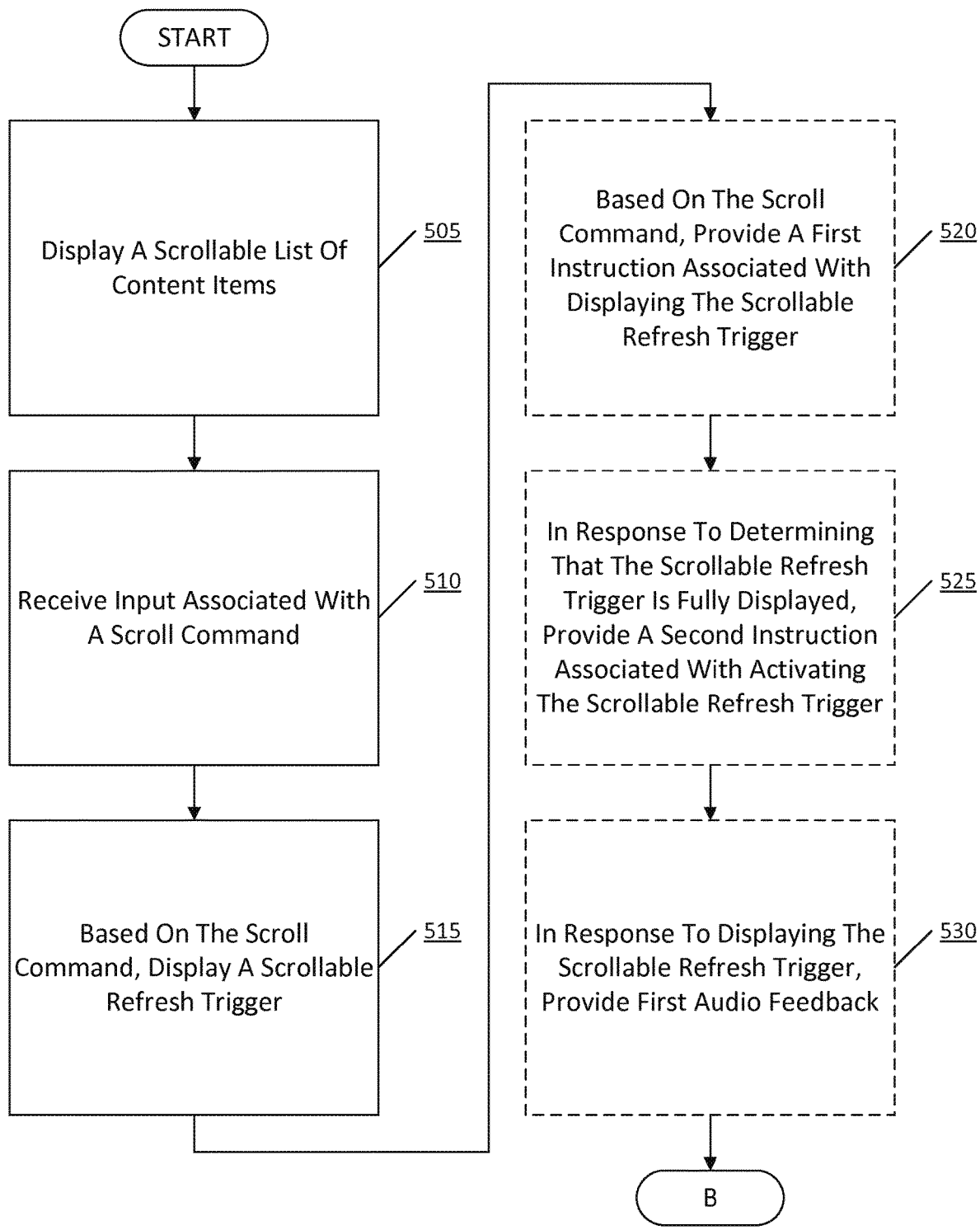
FIGS. 5A and 5B illustrate an example method by which a scrollable list of content items may be refreshed according to one or more aspects described herein.
Figure 5B:
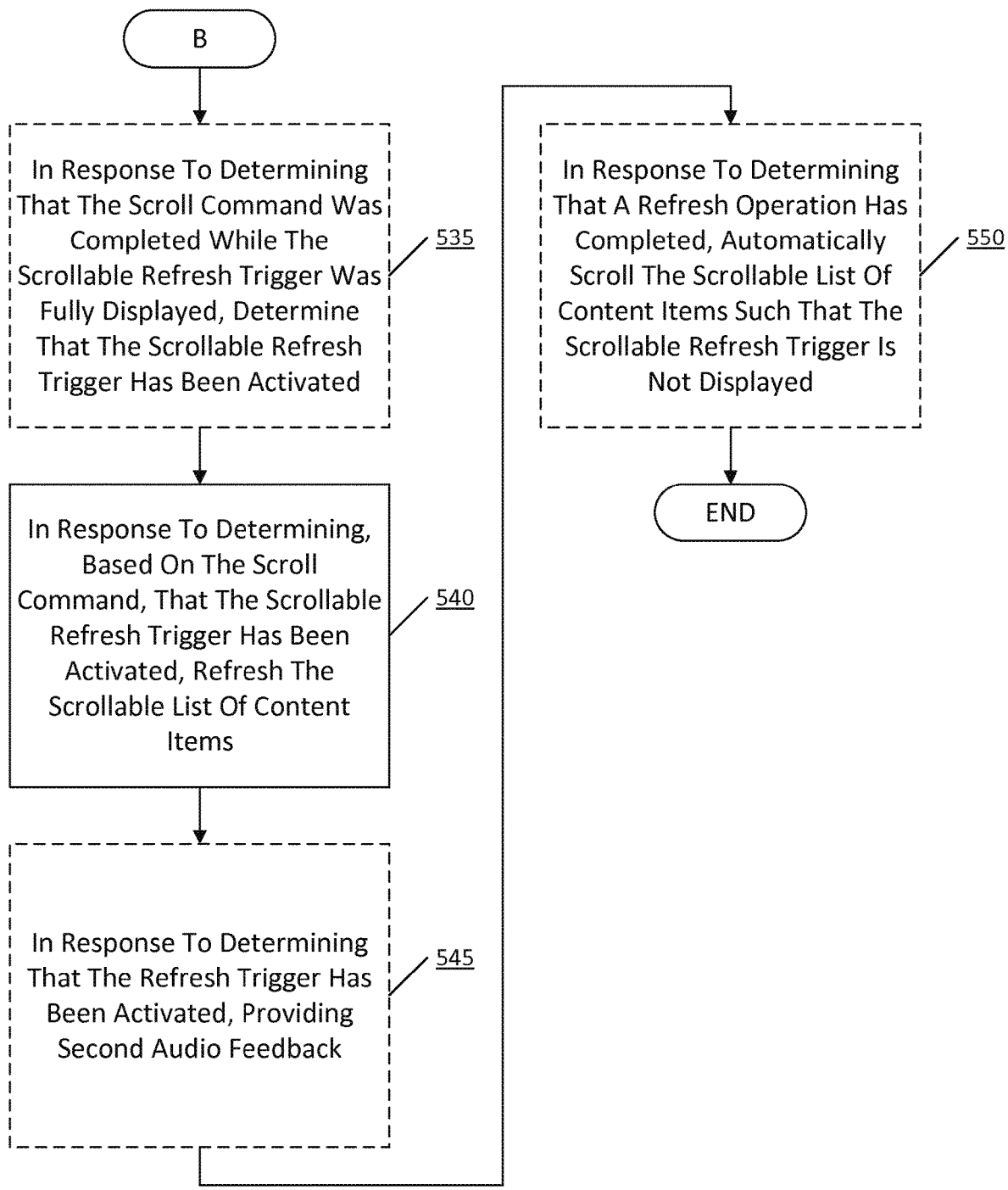

In step 430, the indicator may be removed in response to determining that the second command has been performed. For instance, computing device 100 may determine that the second command has been performed and subsequently may remove the indicator from the display (e.g., by scrolling the content area displayed on touch sensitive display 108 such that the indicator, which may be adjacent to a content item included in the content area, is no longer displayed). In one example, where the second command includes refreshing the content area and/or refreshing content items and/or a listing included in the content area, computing device 100 may wait until the refresh operation has completed before removing the indicator from the display. In this example, computing device 100 thus may wait until new content items (e.g., new email messages, new TWITTER tweets, new FACEBOOK status updates, new GOOGLE BUZZ status updates, etc.) have been downloaded from a server and displayed in the content area before removing the indicator from the display. 1491 FIGS. 5A and 5B illustrate an example method by which a scrollable list of content items may be refreshed according to one or more aspects described herein. According to one or more aspects, the methods described herein, such as the method illustrated in FIGS. 5A and 5B, may be implemented and/or performed by and/or in conjunction with a computing device, such as computing device 100.

In step 505, a scrollable list of content items may be displayed. For example, computing device 100 may display a user interface (e.g., user interface 600 of FIG. 6, which is further described below) that includes a list of content items that may be scrolled (e.g., automatically by computing device 100 upon determining that new content items are available and/or have been added to the list, manually upon a user request to scroll the list of content items, etc.). The one or more content items included in the scrollable list may include any sort of content, such as text, images, audio, video, links, and/or other digital content. In at least one arrangement, the scrollable list may include a chronologically-arranged listing of personal status updates, blog entries, micro-blogging posts (e.g., tweets and/or other status updates associated with TWITTER, status updates associated with GOOGLE BUZZ, status updates associated with FACEBOOK, etc.), news headlines, news articles, text, images, audio, video, links, and/or other content items.

In step 510, input associated with a scroll command may be received. For example, after displaying a scrollable list of content items (e.g., in step 505), computing device 100 may receive user input associated with a scroll command (e.g., a request from a user to scroll the scrollable list of content items, a request from a user to scroll one or more aspects of the user interface more generally, etc.). As with the user input described above with respect to FIGS. 3 and 4, the input associated with the scroll command may be received in connection with a variety of input actions, such as a user interacting with a displayed scroll bar, a user clicking and dragging a content item included in the scrollable list of content items, a user physically manipulating a scroll wheel included in a mouse, and/or a user otherwise interacting with hardware and/or software components of computing device 100. For example, a user may initiate a scroll command by clicking and dragging (e.g., by clicking on and/or selecting a content item and then holding down the mouse button while moving the mouse) a content item included in the scrollable list using a mouse, and a user may complete the scroll command by concluding the dragging (e.g., by releasing the mouse button).

In at least one arrangement, the received input may represent touch-based user input. For instance, the received input may be touch-based user input, associated with a scroll command and received by computing device 100 via touch sensitive display 108, indicating that a user put a finger down on a point on the touch screen corresponding to the scrollable list of content items, slid the finger along the touch screen (e.g., thereby requesting computing device 100 to scroll the scrollable list of content items), and then released the finger (e.g., thereby completing the scroll command). Additionally or alternatively, computing device 100 may receive touch-based user input via a touch-sensitive pad, a touch-sensitive stylus, a touch-sensitive mouse (e.g., a commercially-available APPLE Magic Mouse), and/or any touch-sensitive surface. Further, the manner by which a scroll command is requested and/or completed using any touch-sensitive surface may be similar to the manner described in the example above involving a user's finger (e.g., the user may engage and drag a content item included in the scrollable list of content items to initiate a scroll command, and the user may release and/or finish dragging the content item to complete the scroll command).

In step 515, a scrollable refresh trigger may be displayed based on the scroll command. For example, the scroll command may cause the scrollable list of content items to be scrolled, and as the scrollable list of content items is scrolled, a scrollable refresh trigger may be displayed and/or revealed. The refresh trigger may be scrollable because the refresh trigger may scroll with one or more content items included in the scrollable list of content items.

In addition, the scrollable refresh trigger may be adjacent to a displayed or undisplayed content item included in the scrollable list of content items.

In at least one arrangement, the scrollable refresh trigger may be adjacent to a content item that is the most recent content item included in the scrollable list of content items. In at least one additional arrangement, the scrollable refresh trigger may be adjacent to a content item that is the most relevant content item included in the scrollable list of content items, where relevance may be determined based on a search operation (e.g., a keyword search requested by a user with respect to the one or more content items included in the scrollable list of content items).

In one or more arrangements, the scrollable refresh trigger may include additional components. For instance, the scrollable refresh trigger may include an animated graphic (e.g., an arrow rotating, a spring decompressing, a lock unlocking, etc.), one or more instructions (e.g., an instruction associated with displaying the scrollable refresh trigger, an instruction associated with activating the scrollable refresh trigger, an instruction associated with causing a refresh operation to be performed, etc.), one or more status descriptions (e.g., a status description indicating the freshness of the content included in the scrollable list of content items, a status description indicating when the scrollable list and/or the content items included in the scrollable list were last refreshed, a status description indicating that the scrollable list and/or the content items included in the scrollable list are being refreshed, a status description indicating that one or more content items are being loaded, a status description indicating when one or more content items were previously loaded, a status description indicating the text and/or keywords that were used in a search operation, a status description indicating when a search operation was performed, etc.), one or more previews and/or thumbnails (e.g., when navigating through multiple pages of content, the indicator may include thumbnail images of the previous and/or next pages).

In optional step 520, a first instruction associated with displaying the scrollable refresh trigger may be provided based on the scroll command. For example, computing device 100 may display on touch sensitive display 108 a first instruction, and the first instruction may describe how the scrollable refresh trigger is displayed and/or how the scrollable list of content items may be refreshed. For instance, the first instruction may state: "Pull down to refresh." In at least one arrangement, the first instruction may be included in the scrollable refresh trigger. An example of a first instruction included in a scrollable refresh trigger is further described below with respect to FIG. 8.

In optional step 525, a second instruction associated with activating the scrollable refresh trigger may be provided in response to determining that the scrollable refresh trigger is fully displayed. For example, computing device 100 may display on touch sensitive display 108 a second instruction, and the second instruction may describe how the scrollable refresh trigger may be activated and/or how the scrollable list of content items may be refreshed. For instance, the second instruction may state: "Release to refresh." In at least one arrangement, the second instruction may be included in the scrollable refresh trigger. An example of a second instruction included in a scrollable refresh trigger is further described below with respect to FIG. 9.

In optional step 530, first audio feedback may be provided in response to displaying the scrollable refresh trigger. For example, computing device 100 may provide first audio feedback after displaying the scrollable refresh trigger to alert the user of the scrollable refresh trigger being displayed. Such first audio feedback may include a sliding or shifting sound to coincide with the scrolling of the scrollable refresh trigger and/or the scrollable list of content items.

In optional step 535, it may be determined that the scrollable refresh trigger has been activated in response to determining that the scroll command was completed while the scrollable refresh trigger was fully displayed. For example, if computing device 100 determines that the scroll command was completed (e.g., based on mouse input, touch input, and/or other input, as further described herein) while the scrollable refresh trigger was fully displayed, then computing device 100 may determine that the scrollable refresh trigger has been activated, which further may result in the scrollable list of content items being refreshed, as further described below. On the other hand, if computing device 100 determines that the scroll command was completed while the scrollable refresh trigger was not fully displayed, then computing device 100 may determine that the scrollable refresh trigger has not been activated.

In step 540, the scrollable list of content items may be refreshed in response to determining, based on the scroll command, that the scrollable refresh trigger has been activated. For example, if optional step 545 is performed and it is determined that the scrollable refresh trigger has been activated, the scrollable list of content items may be refreshed. In at least one arrangement, refreshing the scrollable list of content items may include connecting to a server (e.g., a web server), downloading new content items (e.g., new email messages, new TWITTER tweets, new FACEBOOK status updates, new GOOGLE BUZZ status updates, etc.), and displaying the new content items in the scrollable list of content items.

Additionally or alternatively, in an example where optional step 545 is not performed, the scrollable list of content items may be refreshed if it is determined, based on the scroll command, that the scrollable refresh trigger has been activated (e.g., based on whether the scroll command was completed while the scrollable refresh trigger was at least partially displayed). Where, for instance, a user initiates a scroll command by clicking and dragging a content item and/or a handle included in the scrollable list of content items using a mouse (e.g., by clicking on and/or selecting a content item and then holding down the mouse button while moving the mouse), it may be determined that the scroll command is completed when the user concludes the dragging (e.g., by releasing the mouse button). In this example, if and when the user concludes the dragging (e.g., by releasing the mouse button), computing device 100 then may determine whether the scrollable refresh trigger was displayed (e.g., on touch sensitive display 108) when the user concluded the dragging.

If the scrollable refresh trigger was displayed when the user concluded the dragging, computing device 100 may refresh the scrollable list of content items accordingly. On the other hand, if the scrollable refresh trigger was not displayed when the user concluded the dragging, computing device 100 might not refresh the scrollable list of content items.

In another instance in which a user initiates a scroll command by putting one or more fingers down on the displayed scrollable list of content items and/or on the one or more content items included therein (e.g., as displayed on touch sensitive display 108) and scrolls by sliding the one or more fingers along the displayed scrollable list of content items (e.g., along touch sensitive display 108), it may be determined that the scroll command is completed when the user concludes the sliding, releases the displayed scrollable list of content items and/or the one or more content items, and/or lifts up the one or more fingers.

Of course, instead of one or more fingers, a stylus or other object also could be used in a similar manner to accomplish the same purpose.

In optional step 545, second audio feedback may be provided in response to determining that the refresh trigger has been activated. For example, computing device 100 may provide second audio feedback after determining that the refresh trigger has been activated to alert the user that the scrollable list of content items is about to be refreshed. Such second audio feedback may include a sliding or shifting sound to coincide with the scrolling of the scrollable refresh trigger and/or the scrollable list of content items.

Additionally or alternatively, such second audio feedback may include a popping sound to coincide with the activation of the refresh trigger and/or the refreshing of the scrollable list of content items.

In optional step 550, the scrollable list of content items may be scrolled automatically, such that the scrollable refresh trigger is not displayed, in response to determining that a refresh operation has completed. For example, computing device 100 may determine that the refreshing of the scrollable list of content items has been completed and may automatically scroll the scrollable list of content items such that the scrollable refresh trigger is no longer displayed. It may be desirable to provide such automatic scrolling of the scrollable refresh trigger upon completion of the refreshing, as such automatic scrolling may maximize the space available (e.g., on touch sensitive display 108) for displaying the content items included in the scrollable list of content items.

1651 FIGS. 6-11 illustrate sample user interfaces by which a scrollable list of content items may be refreshed according to one or more aspects described herein. According to one or more aspects, the user interfaces described herein, such as the user interfaces illustrated in FIGS. 6-11, may be implemented in, displayed by, and/or used in conjunction with a computing device, such as computing device 100.

Figure 6:
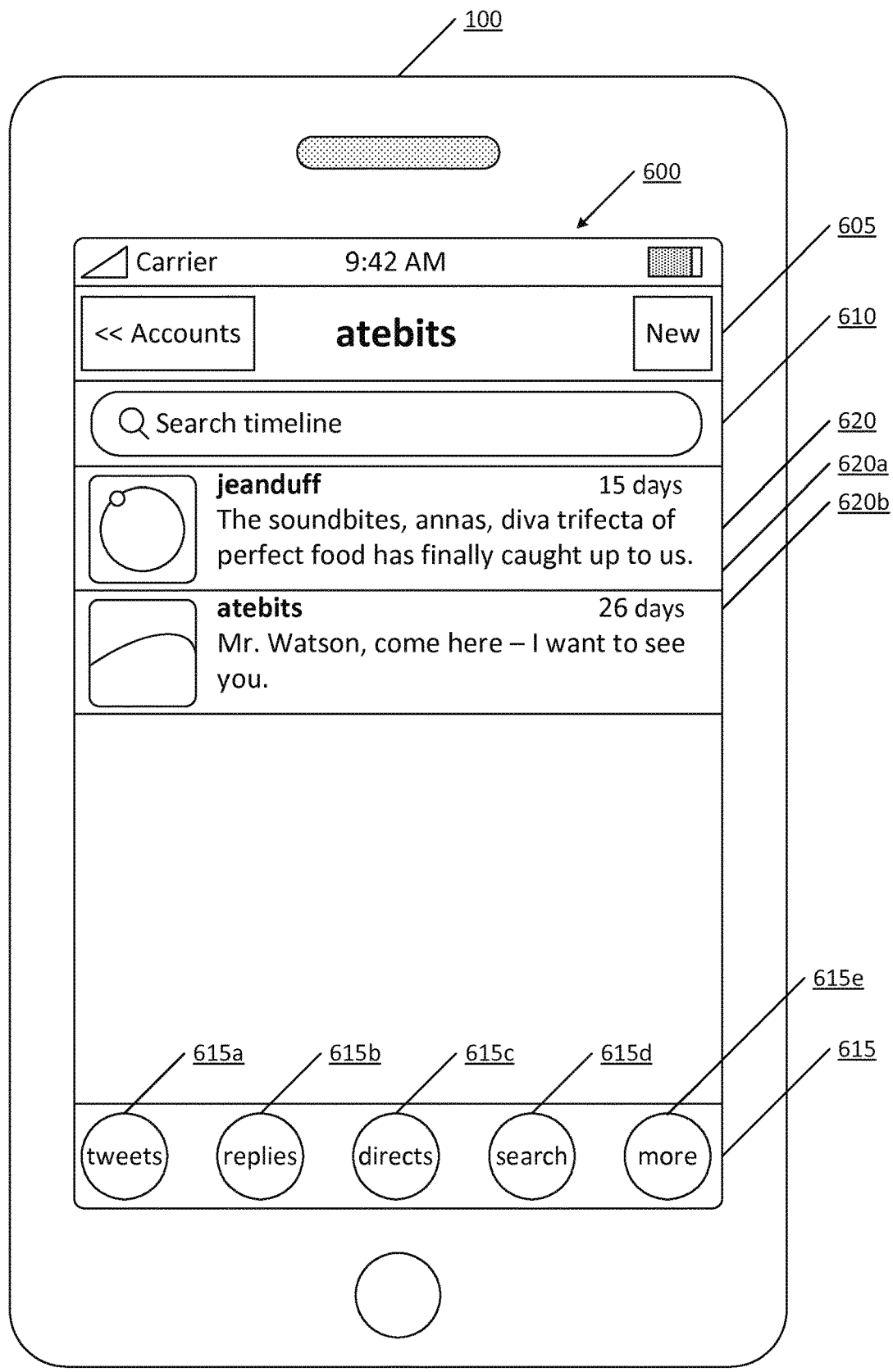
FIGS. 6-11 illustrate example user interfaces by which a scrollable list of content items may be refreshed according to one or more aspects described herein.

As illustrated in FIG. 6, a computing device, such as computing device 100, may display user interface 600. User interface 600 may include a header bar 605, a search bar 610, a menu bar 615, and a scrollable list of content items 620. The scrollable list of content items 620 may include one or more content items, such as content items 620a and 620b.

According to one or more aspects, header bar 605 may include one or buttons that allow a user to select and/or log into and/or out of an account associated with a content provider, such as a social media service (e.g., TWITTER, FACEBOOK, GOOGLE BUZZ, etc.), and/or allow a user to create a new content item associated with such a content provider. Search bar 610 may allow a user to search the scrollable list of content items 620 (e.g., for content items that include particular keywords). Menu bar 615 may include one or more buttons that provide various functionalities.

For example, menu bar 615 may include a tweets button 615a, which may allow a user to view a scrollable list of content items that includes content items from sources to which the user may be subscribed (e.g., status updates and/or other posts from users that the user may follow). Menu bar 615 further may include a replies button 615b, which may allow a user to view a scrollable list of content items that include content items that identify the user (e.g., content items that include the user's username). Menu bar 615 further may include a directs button 615c, which may allow a user to view a scrollable list of content items that include content items that are directed to the user (e.g., content items that include a direct message between the user and another user). Menu bar 615 further may include a search button 615d, which may allow a user to search a network and/or a database (e.g., a database of content items) for additional content items, geographically nearby users, other users, saved keywords, and/or trending topics. Menu bar 615 further may include a more button 615e, which may allow a user to edit his or her profile (e.g., the user's profile associated with the particular content provider, such as their TWITTER profile or FACEBOOK profile); view his or her favorite content items; view and/or edit drafts of content items that the user has created; and/or view, create, and/or edit lists of users (e.g., lists of users that the user may subscribe to and/or follow).

Figure 7:
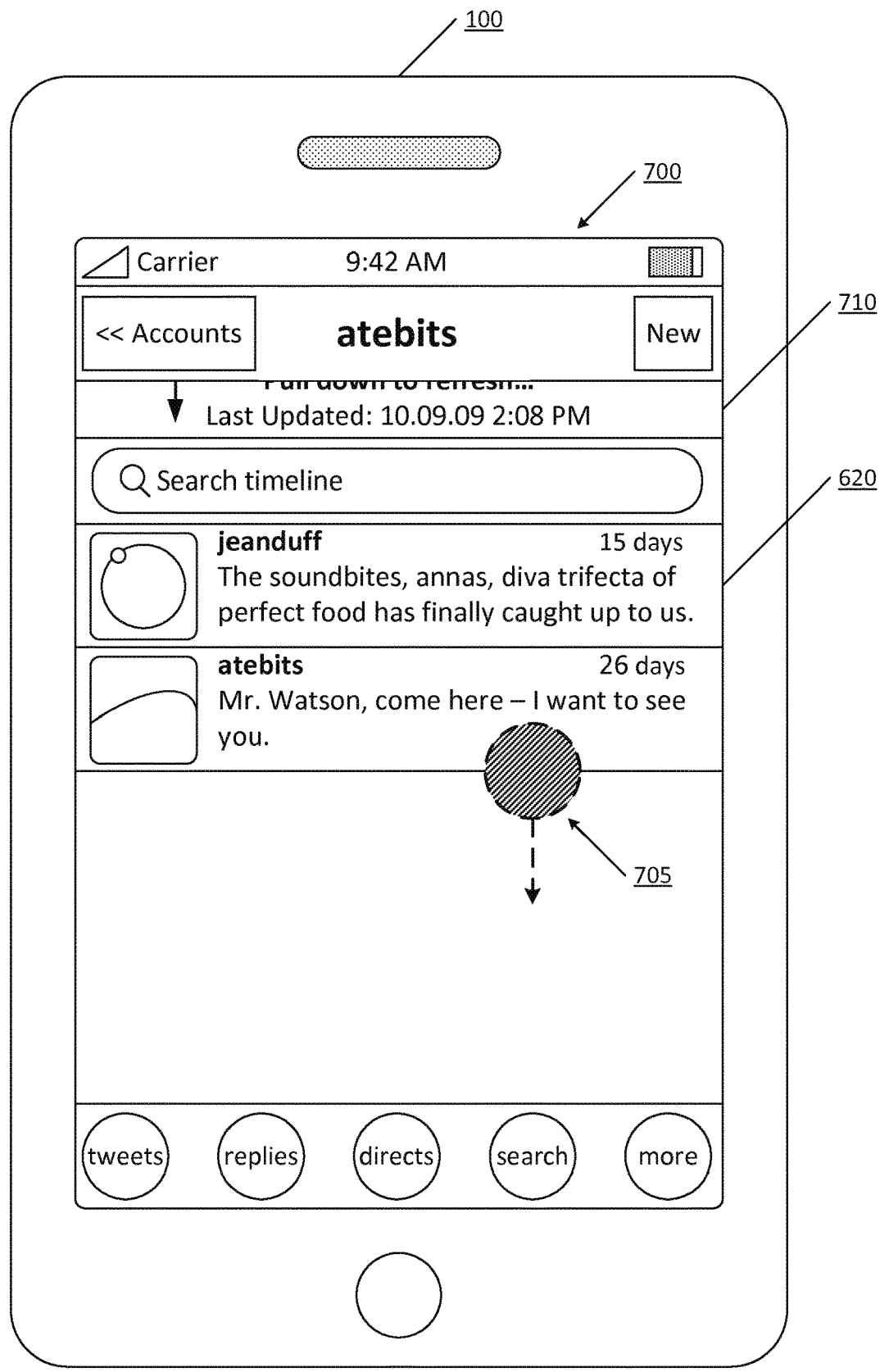

As illustrated in FIG. 7, a computing device, such as computing device 100, may display user interface 700, and further may receive touch-based user input, as represented by touch point 705. Touch point 705 may represent a point on a touch screen included in computing device 100 (e.g., touch sensitive display 108) where a user has put a finger down on the touch screen. Stated differently, touch point 705 may represent a place on the touch screen where the user is touching and/or otherwise in contact with the touch screen (e.g., with a stylus, etc.).

In FIG. 7, for example, the user has put a finger down on touch point 705, which, in this example, is a point corresponding to the scrollable list of content items 620. By subsequently sliding his or her finger along the touch screen (e.g., by sliding the touch point 705 downward), the user may initiate a scroll command, which may result in the scrollable list of content items 620 being scrolled, as reflected by the downward shift in the scrollable list of content items 620 (between FIG. 6 and FIG. 7). In addition, as the scrollable list of content items 620 is scrolled, a scrollable refresh trigger 710 may be revealed and/or displayed. The scrollable refresh trigger 710 may scroll with the one or more content items included in the scrollable list of content items 620, and the scrollable refresh trigger 710 may be adjacent to a displayed or undisplayed content item included in the scrollable list of content items 620. Thus, as the scrollable list of content items 620 is scrolled in accordance with the scroll command, the scrollable refresh trigger 710 also may be scrolled.

Figure 8:
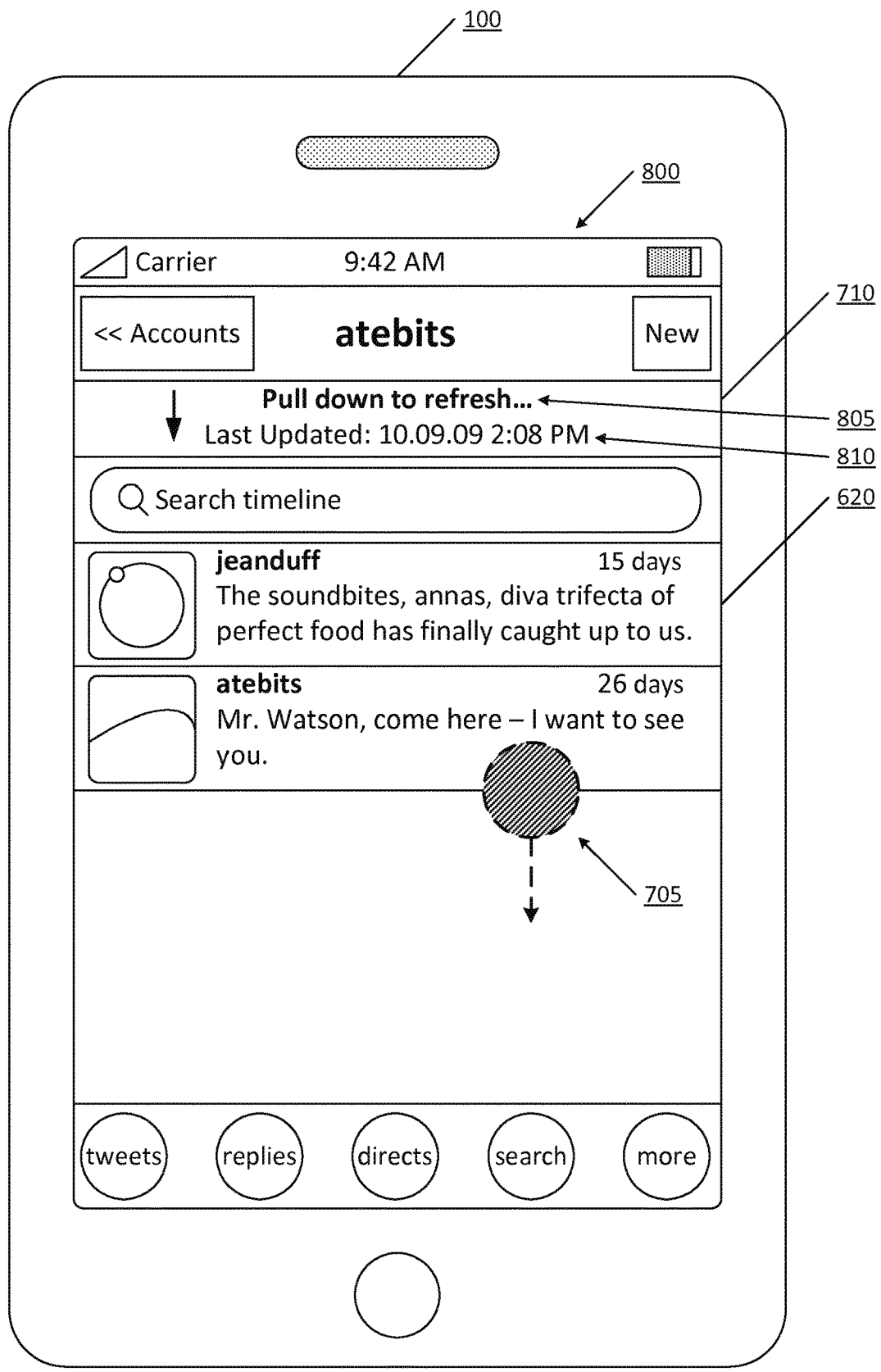

As a user continues to scroll the scrollable list of content items 620 (e.g., by continuing to slide the touch point 705 downward along the touch screen), computing device 100 may display user interface 800, which is illustrated in FIG. 8.

As may be seen in FIG. 8, the continued scrolling of the scrollable list of content items 620 may result in the continued scrolling of the scrollable refresh trigger 710, which also may result in a greater portion of the scrollable refresh trigger 710 being displayed by the computing device 100.

In one or more arrangements, the scrollable refresh trigger 710 may include an instruction and/or a status description, such as instruction 805 and status description 810, respectively.

Instruction 805 may describe how the scrollable refresh trigger 710 is displayed and/or how the scrollable list of content items 620 may be refreshed. For instance, instruction 805 may state: "Pull down to refresh." Status description 810 may include one or more status descriptions, which are further described above. For instance, status description 810 may state: "Last Updated: 10.09.09 2:08 PM," which may indicate when the scrollable list of content items 620 was last refreshed.

Figure 9:
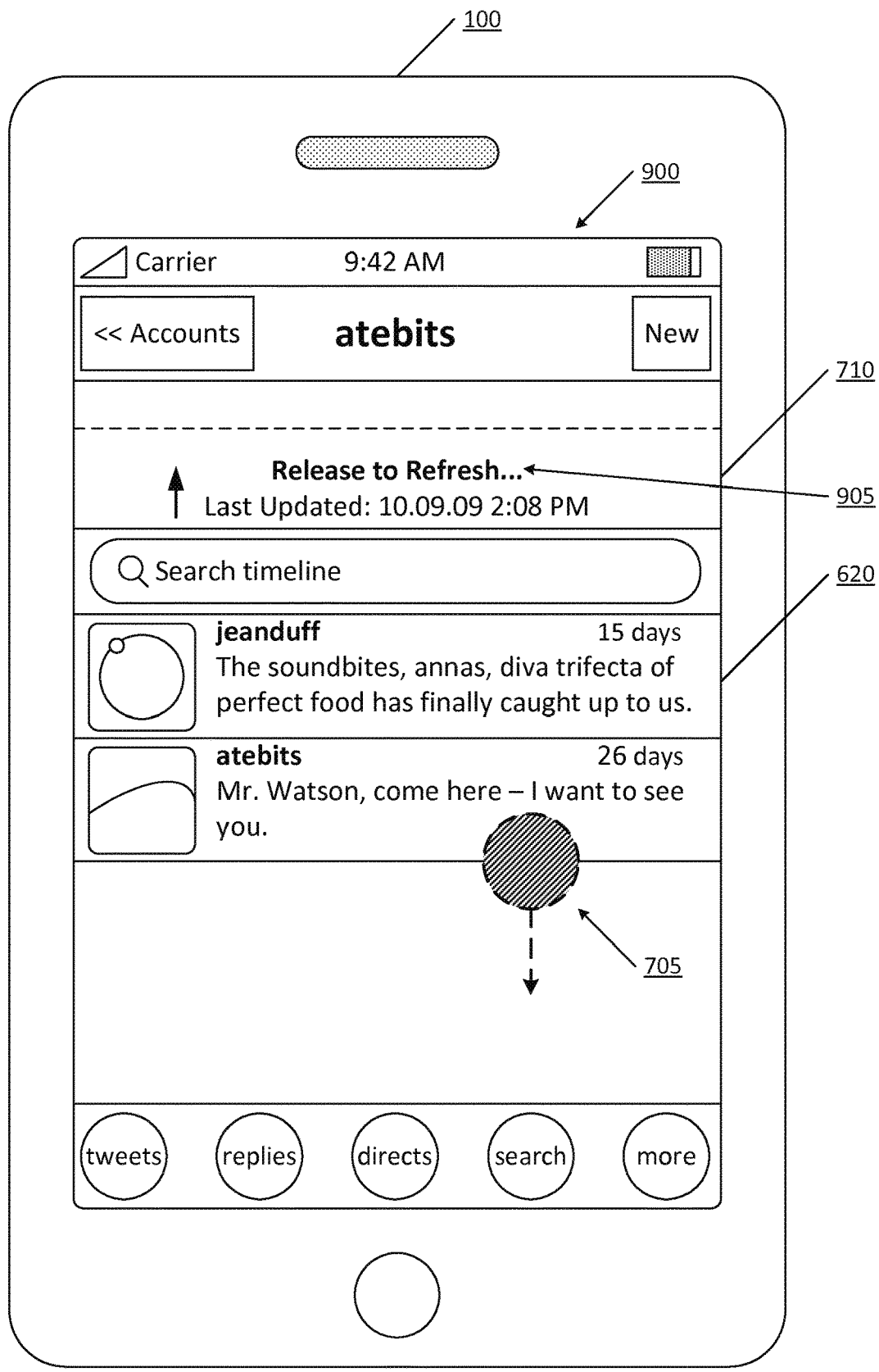

As a user continues to scroll the scrollable list of content items 620 (e.g., by continuing to slide the touch point 705 downward along the touch screen), computing device 100 may display user interface 900, which is illustrated in FIG. 9.

As may be seen in FIG. 9, the continued scrolling of the scrollable list of content items 620 may result in the continued scrolling of the scrollable refresh trigger 710, which also ultimately may result in the scrollable refresh trigger 710 being fully displayed by the computing device 100. The dotted line in FIG. 9 above the scrollable refresh trigger 710 may represent a top edge of the scrollable refresh trigger 710.

In one or more arrangements, when the scrollable refresh trigger 710 is fully displayed, an instruction, such as instruction 905, may be displayed. Instruction 905 may describe how the scrollable refresh trigger 710 may be activated and/or how the scrollable list of content items 620 may be refreshed. For instance, instruction 905 may state: "Release to refresh."

As described above, completing a scroll command while the scrollable refresh trigger 710 is displayed (and/or fully displayed in at least one arrangement) may result in the refreshing of the scrollable list of content items. Additionally or alternatively, and also as described above, completing a first command while an indicator is displayed may result in the performing of a second command, the second command being independent of the first command. Thus, if the user lifts up his or her finger from touch point 705 on the touch screen or otherwise completes the scroll command (e.g., by concluding a drag operation, by releasing a mouse button, etc.) while the scrollable refresh trigger 710 is displayed, computing device 100 may begin refreshing the scrollable list of content items 620 and further may display user interface 1000, which is illustrated in FIG. 10.

Figure 10:
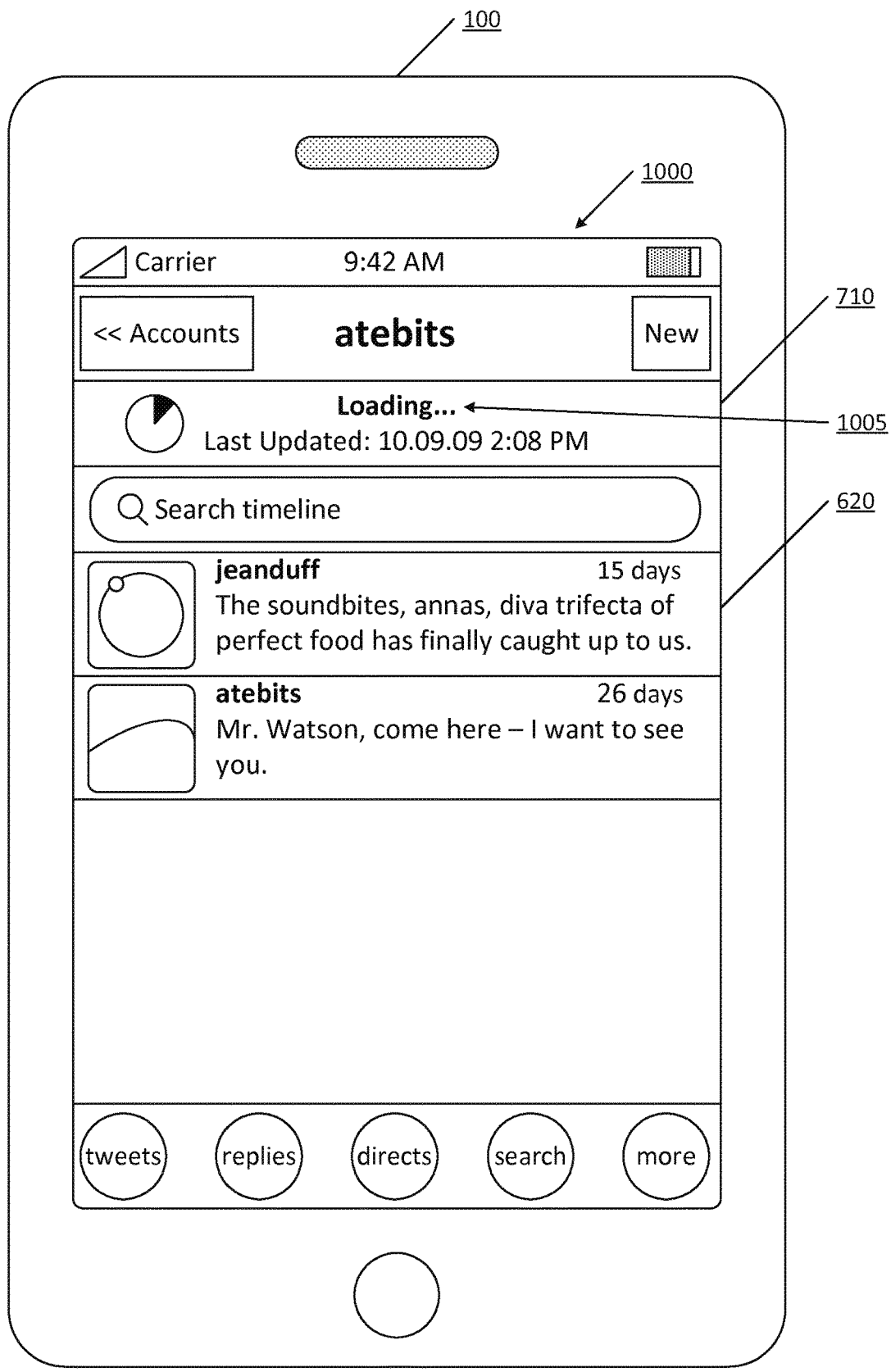

As may be seen in FIG. 10, after the user lifts up his or her finger from touch point 705 on the touch screen or otherwise completes the scroll command, a status description 1005 may be displayed. Status description 1005 may state, for instance, "Loading" to inform the user that computing device 100 is refreshing the scrollable list of content items 620 and/or loading new data (e.g., downloading recent and/or unread content items from a remote server, such as a TWITTER or FACEBOOK server).

Figure 11:
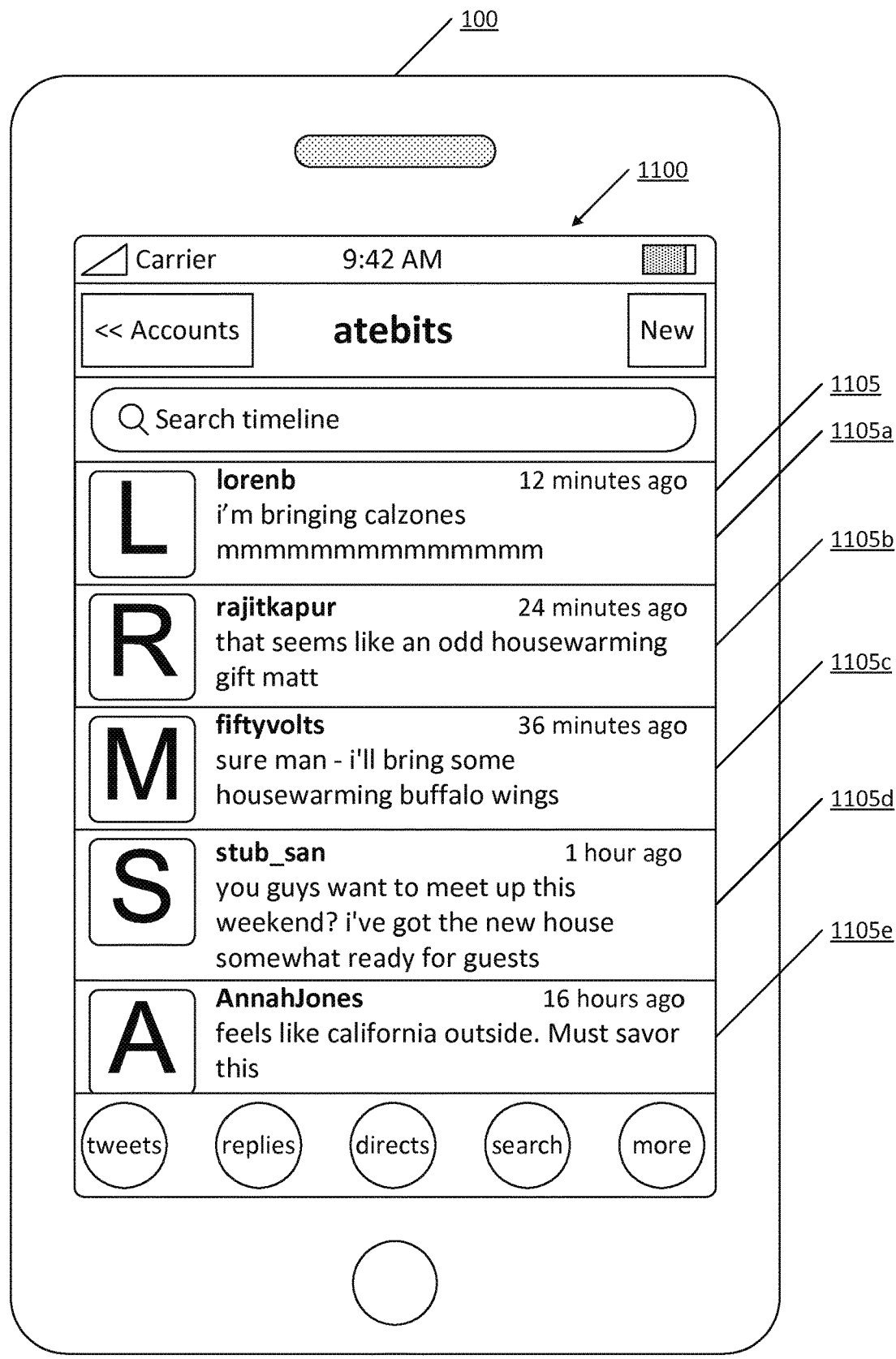

Once computing device 100 has loaded new data, computing device 100 may display user interface 1100, which is illustrated in FIG. 11. As may be seen in FIG. 11, user interface 1100 may include a refreshed scrollable list of content items 1105, which may include one or more new and/or updated content items, such as content items 1105a, 1105b, 1105c, 1105d, and 1105e. In addition, and as further described above, once the refreshing is complete, the refreshed scrollable list of content items 1105 may be scrolled automatically and/or displayed such that the scrollable refresh trigger is no longer displayed. As in FIGS. 6 and 7, however, a user may reveal the scrollable refresh trigger by scrolling the refreshed scrollable list of content items 1105.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof.

Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

I claim:

1. A method for a computing device including a touchscreen display, the method comprising:
   displaying, on the touchscreen display, a refreshable list of content items;
   activating a refresh trigger based on a drag input to the touchscreen display for pulling down the list of content items; and
   refreshing the list of content items in response to activating the refresh trigger,
   wherein the activating of the refresh trigger comprises determining whether the list of content items is pulled down more than a predetermined distance on the touchscreen display and the refresh trigger is activated only if the list of content items is pulled down more than the predetermined distance.

2. The method according to claim 1, wherein the activating of the trigger further comprises detecting release of the pulled-down list of content items.

3. The method according to claim 1, wherein the list of content items is organized chronologically.

4. The method according to claim 1, wherein the list of content items comprises email messages.

5. The method according to claim 1, wherein the list of content items comprises a social media timeline.

6. The method according to claim 1, further comprising displaying, concurrently with the list of content items, a search bar.

7. The method according to claim 1, further comprising displaying, concurrently with the list of content items, a visual display element selectable for allowing composition of a new content item.

8. The method according to claim 1, further comprising displaying, on the touchscreen display, refresh status information during the refreshing of the list of content items.

9. The method according to claim 1, further comprising displaying, on the touchscreen display, an animated graphic in an area above an uppermost content item of the pulled-down list of content items.

10. A computing device comprising:
    a touchscreen display;
    a memory storing a program; and
    one or more hardware processors operatively coupled to the memory and the touchscreen display, the processors being configured to execute the program stored in the memory to control the computing device to perform operations comprising:
    displaying, on the touchscreen display, a refreshable list of content items;
    activating a refresh trigger based on a drag input to the touchscreen display for pulling down the list of content items; and
    refreshing the list of content items in response to activating the refresh trigger,
    wherein activating the refresh trigger comprises determining whether the list of content items is pulled down more than a predetermined distance on the touchscreen display and the refresh trigger is activated only if the list of content items is pulled down more than the predetermined distance.

11. The computing device according to claim 10, wherein the activating of the trigger further comprises detecting release of the pulled-down list of content items.

12. The computing device according to claim 10, wherein the list of content items is organized chronologically.

13. The computing device according to claim 10, wherein the list of content items comprises email messages.

14. The computing device according to claim 10, wherein the list of content items comprises a social media timeline.

15. The computing device according to claim 10, wherein the processors are configured to control the computing device to display, concurrently with the list of content items, a search bar.

16. The computing device according to claim 10, wherein the processors are configured to control the computing device to display, concurrently with the list of content items, a visual display element selectable for allowing composition of a new content item.

17. The computing device according to claim 10, wherein the processors are configured control the computing device to display, on the touchscreen display, refresh status information during the refreshing of the list of content items.

18. The computing device according to claim 10, wherein the processors are configured to control the computing device to display, on the touchscreen display, an animated graphic in an area above an uppermost content item of the pulled-down list of content items.

19. A non-transitory computer-readable medium storing program instructions which, when executed, cause one or more hardware processors to control a computer device comprising a touchscreen display to at least:
    display, on the touchscreen display, a refreshable list of content items;
    activate a refresh trigger based on a drag input to the touchscreen display for pulling down the list of content items; and
    refresh the list of content items in response to activating the refresh trigger,
    wherein the activating of the refresh trigger comprises determining whether the list of content items is pulled down more than a predetermined distance on the touchscreen display and the refresh trigger is activated only if the list of content items is pulled down more than the predetermined distance.

20. The non-transitory computer-readable medium according to claim 19, wherein the activating of the trigger further comprises detecting release of the pulled-down list of content items.

21. A computing device comprising:
    a non-transitory computer-readable medium according to claim 19; and one or more hardware processors configured to access the program instructions stored on the non-transitory computer-readable medium.

22. A smartphone comprising:
a non-transitory computer-readable medium according to claim 19; and
one or more hardware processors configured to access the program instructions stored on the non-transitory computer-readable medium.

23. The non-transitory computer-readable medium according to claim 19, wherein the list of content items is organized chronologically.

24. The non-transitory computer-readable medium according to claim 19, wherein the list of content items comprises email messages.

25. The non-transitory computer-readable medium according to claim 19, wherein the list of content items comprises a social media timeline.

26. The non-transitory computer-readable medium according to claim 19, wherein the instructions control the computing device to display, concurrently with the list of content items, a search bar.

27. The non-transitory computer-readable medium according to claim 19, wherein the instructions control the computing device to display, concurrently with the list of content items, a visual display element selectable for allowing composition of a new content item.

28. The non-transitory computer-readable medium according to claim 19, wherein the instructions control the computing device to display, on the touchscreen display, refresh status information during the refreshing of the list of content items.

29. The non-transitory computer-readable medium according to claim 19, wherein the instructions control the computing device to display, on the touchscreen display, an animated graphic in an area above an uppermost content item of the pulled-down list of content items.

* * * * *